(12) United States Patent
Peddle et al.

(10) Patent No.: US 8,439,368 B2
(45) Date of Patent: May 14, 2013

(54) ARTICULATING SEAL (75) Inventors: Darron G. Peddle, Millersburg, IN (US); Edward Bruce Whithead, Syracuse, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 391 days.

(21) Appl. No.: 12/845,268

(22) Filed: Jul. 28, 2010

(65) Prior Publication Data

US 2011/0031705 A1 Feb. 10, 2011

Related U.S. Application Data (60) Provisional application No. 61/231,049, filed on Aug. 4, 2009.

(51) Int. Cl.
*F16J 15/02* (2006.01)

(52) U.S. Cl.
USPC .......................................... 277/637; 277/644

(58) Field of Classification Search .................. 277/607, 277/609, 616, 630, 637, 644
See application file for complete search history.

(56) References Cited

U.S. PATENT DOCUMENTS

| | | |
|---|---|---|
| 2,007,501 A | 7/1935 | Millmine |
| 3,028,165 A | 4/1962 | Collins |
| 3,545,774 A | 12/1970 | Rickley |
| 3,815,771 A | 6/1974 | Marks |
| 4,274,544 A | 6/1981 | Westfall |
| 4,516,783 A | 5/1985 | Mitsue et al. |
| 4,690,414 A * | 9/1987 | Haaland ........................ 277/616 |
| 4,697,716 A | 10/1987 | Mumford |
| 5,169,161 A * | 12/1992 | Jones ............................ 277/615 |
| 5,868,273 A | 2/1999 | Daenen et al. |
| 5,946,501 A * | 8/1999 | Hayakawa ..................... 396/25 |

FOREIGN PATENT DOCUMENTS

GB 2 111 965 A 7/1983

* cited by examiner

*Primary Examiner* — Vishal Patel (74) *Attorney, Agent, or Firm* — John A. Molnar, Jr.; Don W. Bulson (57) ABSTRACT

A known gland 11 includes first and second members 12 and 13. Prior art seals 33 (FIGS. 1A and 1B), 40 (FIG. 2A and 2B) or 50 (FIG. 3) can be used to seal the gland 11. Also, a novel, double acting, over center cone, articulating compression seal 60 (FIGS. 4 and 5) can be used to seal the gland 11. The seal 60 includes a base 61, an articulating compression arm 62, and a rocker 63. The arm 62 is connected to the base 61 at one hinge region 73 and to the rocker 63 at another hinge region 83. The articulating compression arm 62 is cone shaped, and the cone inverts as the seal 60 is displaced from a relaxed position (FIG. 4) to a sealed position (FIG. 5). The rocker 63 extends radially and longitudinally in the relaxed position and extends longitudinally in the sealing position.

22 Claims, 5 Drawing Sheets

ARTICULATING SEAL

CROSS REFERENCE TO RELATED APPLICATIONS

The present application claims the benefit of the filing date of U.S. Provisional Patent Application Ser. No. 61231049, filed Aug. 4, 2009, the disclosure of which is incorporated herein by reference in its entirety.

TECHNICAL FIELD

This invention relates to an elastomeric seal for a fluid containment vessel. More particularly, this invention relates to such a seal that is particularly adapted for use under positive and negative pressure conditions such as in a consumer potable liquid vessel.

BACKGROUND OF THE INVENTION

Seals for consumer products can present challenging environments. The sealing surfaces that are to be sealed may be spaced relatively far apart and may be manufactured to various tolerances. Additionally, the seals may be subject to repeated use over prolonged periods of time, and the seals may require low assembly forces or torques. Still further, the seals may be used by a variety of users of different abilities, and the seals may be stored for long periods of time in harsh conditions of temperature and humidity and sunlight. Also, the seals may be exposed to a wide variety of positive and negative pressure conditions and may be exposed to a wide variety of fluid types and to various contaminants.

One such consumer application for seals that presents some or all of these conditions is a flexible and expandable potable fluid container widely used to carry water and other potable liquids in a minimum space and with maximum convenience. In such use, the seal may need to seal relatively wide spaces and may need to accommodate repeated uses without leaking, jamming or otherwise failing.

SUMMARY OF THE INVENTION

The present invention provides an annular elastomeric seal that may be used in a wide variety of applications, including but not limited to consumer potable liquid containers.

The annular elastomeric seal includes a base, an articulating compression arm, and a rocker. The terms articulate or articulating as used herein refer to being or becoming united by or as if by a hinge. The base and the articulating compression arm and the rocker each may have a longitudinal axis, each may be of elastomeric material, each may be generally annular, and each may have a relaxed position and a sealing position. The annular base provides a device for locating the seal and holding it in its relaxed position and its sealing position when the seal is installed. The rocker provides a sealing surface for preventing leakage when the seal is installed. The compression arm articulates relative to the base and relative to the rocker, to guide movement of the rocker and to apply a compression force against the rocker and its sealing surface to maintain sealing contact when the seal is installed.

The articulating compression arm is generally conical, with oppositely facing external surfaces generally extending between the base and the rocker. The articulating compression arm may be connected to the base at a first hinge region and it may be connected to the rocker at a second hinge region. The articulating compression arm may be rotated relative to the base about the first hinge region and may be rotated relative to the rocker about the second hinge region when the rocker and the articulating compression arm are displaced from their relaxed positions to their sealing positions.

The seal may be installed for use with first and second container members. The first container member may include a groove for receiving the base of the seal. The second container member may include a tapered annular sealing surface that cooperates with the sealing surface of the rocker, and the rocker sealing surface may be generally convex and may be generally curved. The rocker may be displaced longitudinally, and radially toward the base and the groove, as the container members are assembled and the seal articulates. Further, the cone shaped articulating compression arm rotates about both of the hinge regions, inverts, and exerts a compression sealing force against the rocker to establish and maintain sealing contact between the rocker sealing surface and the second container member sealing surface as the container members are assembled.

The articulating compression arm and the rocker define opposite legs of a first generally U-shaped pattern, and the articulating compression arm and the base define a second generally U-shaped pattern. The openings of the U-shaped patterns face in opposite directions, and the openings of the U-shaped patterns are narrowed as the seal is displaced from its relaxed position to its sealing position.

The invention also provides various ones of the features and structures described in the claims set out below, alone and in combination, which claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1A:
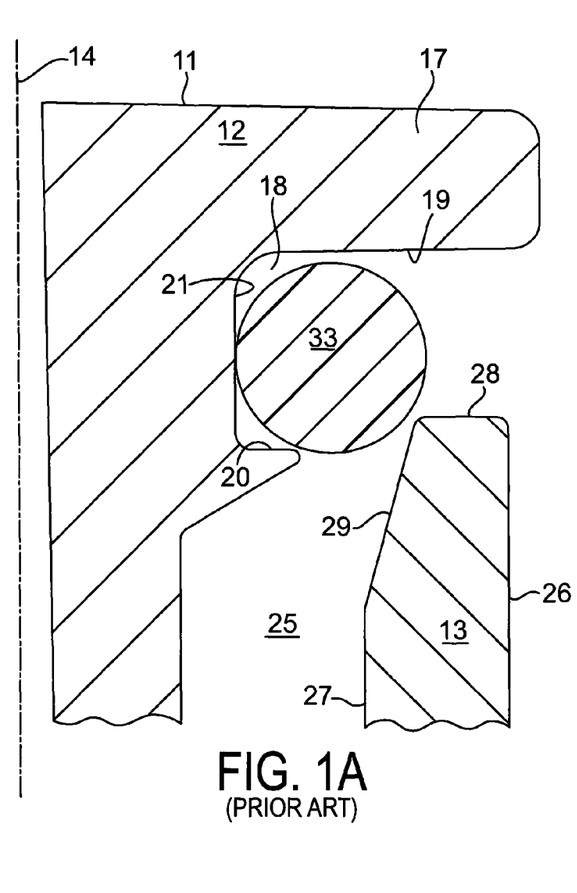
FIG. 1A is a cross sectional view of a known prior art seal, in a relaxed position, in combination with known first and second container members.

Referring now to the drawings in greater detail, FIG. 1A shows a well known gland 11 that includes a first member 12 and a second member 13. The members 12 and 13 are movable relative to one another and may be portions of any device of any material for any application. In the preferred embodiment, the member 12 is a portion of a removable closed end cap and the member 13 is a portion of a container on which the cap is used. The container member 13 in the preferred embodiment is a portion of a flexible expandable bag type liquid container that may be used by consumers for storing and dispensing potable liquid beverages in a light weight, convenient, generally spill and leak resistant, and space saving manner. The expandable bag of the container is not shown. The members 12 and 13 are each annular with a longitudinal axis 14, and each is molded with a suitable potable beverage resistant thermoplastic material, in a well know manner. The cap member 12 and the container member 13 each include mating threads (not shown) or other suitable attachment surfaces that join and secure together the cap member 12 and the container member 13.

As further shown in FIG. 1A, the cap member 12 includes a top 17 that includes a portion (not shown) that extends radially continuously to the longitudinal axis 14, so that cap member 12 provides a closed end cap. The cap member 13 also includes an annular radially outwardly facing seal receiving groove 18. The groove 18 is defined by a first circumferentially continuous annular radial end wall 19 that extends radially and faces longitudinally in a first longitudinal direction, a second circumferentially continuous radial end wall 20 that extends radially and faces longitudinally in a second longitudinal direction opposite the first direction, and a longitudinally extending circumferentially continuous radially outwardly facing bottom wall 21 that extends between the walls 19 and 20.

The container member 13 surrounds a circular access hole or opening 25 that is used for filling and emptying the container. The container member 13 includes a radially outwardly facing circumferentially continuous longitudinal wall 26, a radially inwardly facing circumferentially continuous longitudinal wall 27, an end wall 28, and a tapered wall 29 that extends longitudinally and radially between the walls 27 and 28 and that provides a sealing surface as described below. The walls and opening described above are all coaxial about the axis 14.

As viewed in FIG. 1A, the cap member 12 and the container member 13 are shown in a partially closed or first position in which the above described mating threads are fully engaged but only loosely connected to close but not seal the opening 25. In this position, the cap member 12 is coaxially aligned with the container member 13, but the members 12 and 13 are not sealingly connected. As viewed in FIG. 1B, the above described threaded connection between the cap member 12 and the container member 13 is fully tightened to both close and seal the opening 25, and the cap member 12 and container 13 are longitudinally displaced relative to one another until a sealing or second position is reached in which the end wall 28 contacts the radial wall 19 to stop further tightening. In the sealing position shown in FIG. 1B, the radial walls 19 and 20, the bottom wall 21, and the tapered wall 29 cooperatively define a circumferentially continuous annular sealing cavity 30 of predetermined volume. The longitudinal axis 14 is not illustrated in FIG. 1B to save space in the drawings.

A known prior art seal 33 is shown in FIG. 1A and is a conventional annular O-ring seal 33 of any known appropriate material. The seal 33 is shown in the gland 11 in its relaxed position in FIG. 1A and is shown in its energized or sealing position in FIG. 1B. As the cap member 12 and container member 13 are displaced longitudinally relative to one another during movement from the position shown in FIG. 1A to the position shown in FIG. 1B, the tapered sealing surface 29 engages the O-ring seal 33 and squeezes it into the chamber 30 with sufficient force to seal against leakage between the cap member 12 and the container member 13 without over stressing the O-ring seal 33, all in a known manner.

Figure 1B:
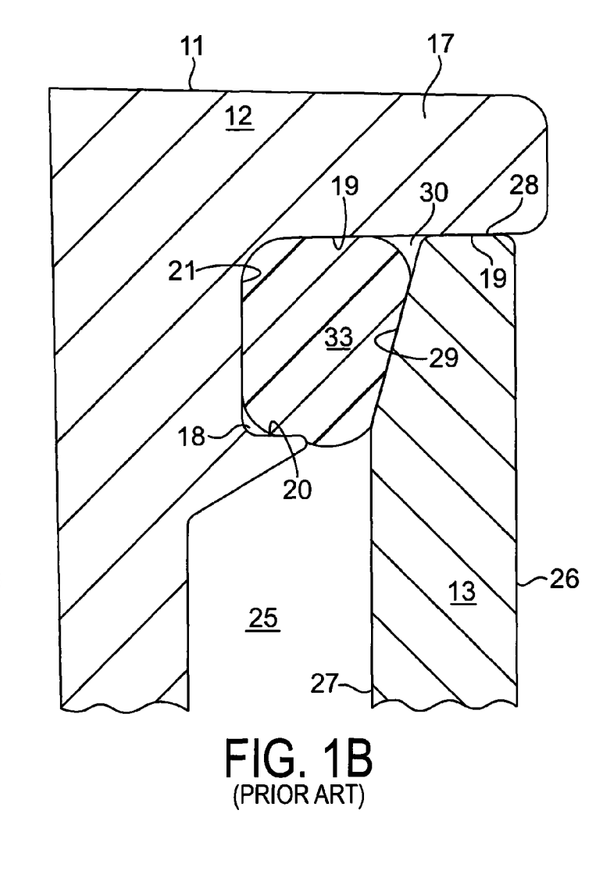
FIG. 1B is a view similar to FIG. 1A, but showing the seal and the container members in a sealing position.

O-ring seals such as the seal 33 are effective seals in many applications, but may not be preferred for the application shown in FIGS. 1A and 1B and described above. This is because of the radial distance or offset between the walls 21 and 29, the dimensional tolerances, the potential presence of contaminants, the frequent opening and closing of cap member 12 relative to the container member 13, and the low sealing forces desired in this application make a different type of seal a preferred option for this application.

Figure 2A:
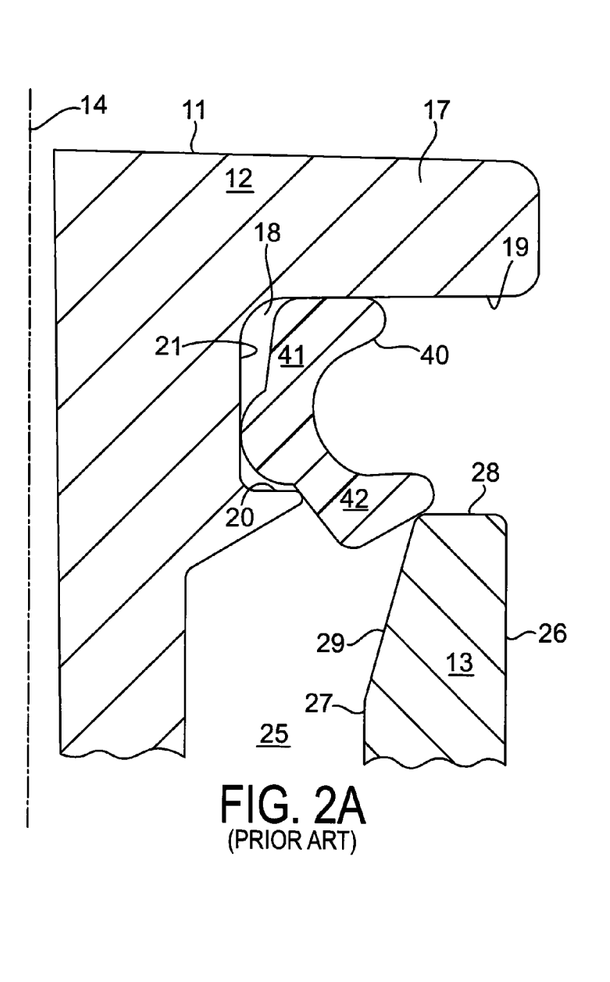
FIG. 2A is a cross sectional view of another known prior art seal, in a relaxed position, in combination with known first and second container members.
Figure 2B:
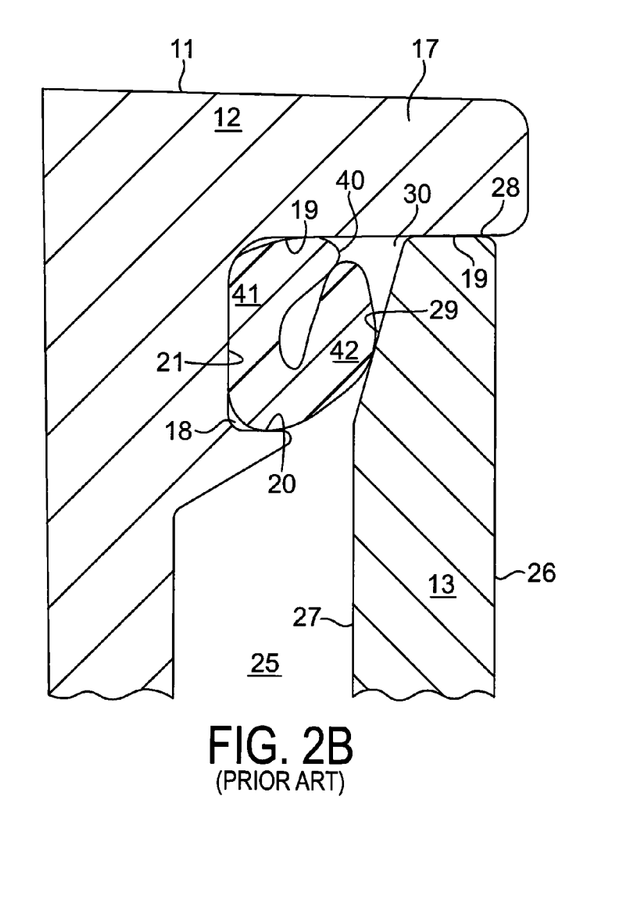
FIG. 2B is a view similar to FIG. 2A, but showing the seal and the container members in a sealing position.

FIGS. 2A and 2B illustrate a prior art Pac-man or C-shaped cross section seal 40 installed on the gland 11 in place of the O-ring seal 33. The gland 11 and its first position and second position shown in FIGS. 2A and 2B are the same as illustrated in FIGS. 1A and 1B. The seal 40 is a one piece elastomeric seal of any known appropriate material and includes an annular base 41 arranged in the groove 18 in a known tightly stretched condition to retain the seal 40 in the groove 18. A sealing lip 42 extends longitudinally and radially from the base 41. A distal end of the tapered sealing surface 29 initially engages a sealing surface 43 of the lip 42 in the first position shown in FIG. 2A. The lip 42 is displaced relative to the base 41 about a hinge region at the intersection of the base 41 and lip 42, and the seal reaches its sealing position shown in FIG. 2B when the gland 11 is in its fully tightened position.

The seal 40 shown in FIGS. 2A and 2B is suitable for many applications, but it may not be a preferred seal for the potable liquid container described above. This is because the potable liquid container application described above exposes the opening 25 to both positive and negative pressure conditions relative to its ambient pressure. The negative pressure or vacuum condition on the inside of the container may be present when liquid is withdrawn from the container (such as by suction) or when the temperature of liquid in the container decreases. Similarly, the positive pressure condition on the inside of the container may be present when the flexible container bag described above is compressed or when the temperature of liquid in the container increases. The seal 40 may not be preferred for the positive pressure condition, and the lip 42 may be forced away from the tapered sealing surface 29 and permit leakage under some such positive pressure conditions.

Figure 3:
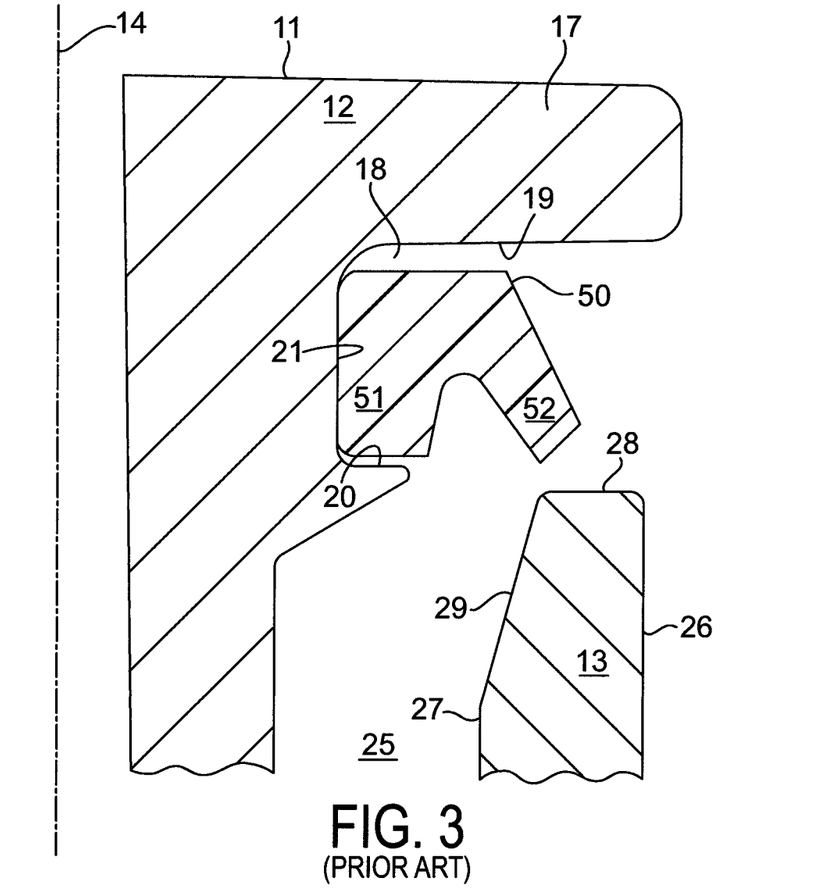
FIG. 3 is a cross sectional view of another known prior art seal, in a relaxed position, in combination with known first and second container members.

FIG. 3 illustrates still another prior art seal 50 installed in the same known gland 11. FIG. 3 illustrates the gland 11 in its first position described above. The seal 50 is a positive pressure energized lip seal that includes a base 51 and a lip 52. The seal 50 is suitable for many applications, but it is not preferred for the flexible bag type potable liquid container application described herein that exposes the seal to both positive and negative pressure conditions. This is because the seal 50 may be pinched during assembly of the cap member 12 onto the container member 13, and also because the seal 50 is not a preferred seal for both positive and negative pressure conditions.

Figure 4:
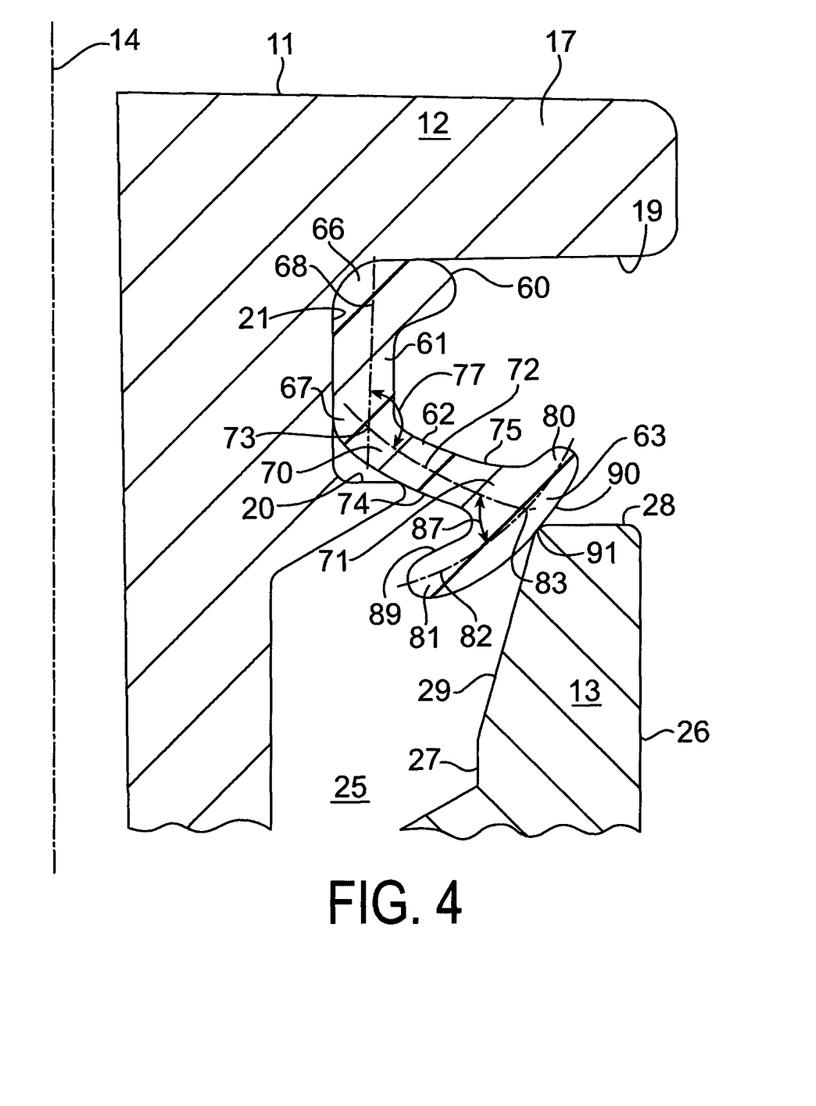
FIG. 4 is a cross sectional view of a seal according to a first preferred embodiment of this invention, in a relaxed position, in combination with known first and second container members.

Referring now to FIG. 4, one preferred embodiment of this invention is illustrated. In this embodiment, a double acting, over center inverting cone, articulating compression seal 60 is assembled in the gland 11. The gland 11 in FIG. 4 is the same well known gland illustrated in the previously described Figures, and FIG. 4 additionally illustrates one of the previously described threads extending from surface 27 to threadably connect the members 12 and 13 together.

FIG. 4 illustrates the gland 11 and the seal 60 in a first or relaxed position. The seal 60 shown In FIG. 4 includes a base 61, an articulating compression arm 62, and a rocker 63. The seal 60 including its components described herein is circumferentially continuous, annular, and molded as a single piece construction from an elastomeric material. The material may be any suitable material selected based upon its physical and chemical properties. In the preferred embodiment the seal is of a known polytetrafluoroethylene (PTFE) coated ethylene propylene diene M classification (under American Society for Testing Materials standard D-1418) synthetic rubber material (EPDM) according to American Society for Testing Materials Specification D2000 M2DA607A26B36EA14 and is compliant with 21 United States Code of Federal Regulations 177.1219.

Still referring to FIG. 4, the base 61 is generally cylindrical and is dimensioned so that it is tightly stretched over the bottom wall 21 of the groove 18 when the seal 60 is installed as shown. The base 61 extends longitudinally between first and second distal end regions 66 and 67 of the base 61 and has a centerline 68 along the midpoint of the cross sectional width of the base 61. The ratio of the cross sectional length of the base 61 between its distal end regions along the centerline 68 to its cross sectional width as viewed in FIG. 4 is greater than two, to one to permit required expansion of the base 61 when it is assembled onto the groove 18. The seal 60 as shown in FIG. 4 is in a first position or relaxed position, which means that the seal is in a position in which the articulating arm 62 and the rocker 63 are not deflected or energized by cooperating assembly of the members 12 and 13 of the gland 11. The seal 60 in this position is relaxed before assembly of the gland 11 but may be tightly stretched as assembled on one of the gland members 12 or 13 as further described herein.

The articulating compression arm 62 extends longitudinally and radially from the base 61. The articulating compression arm 62 has first and second distal end regions 70 and 71 and has a centerline 72 along the midpoint of the cross sectional width of the articulating compression arm 62. The ratio of the cross sectional length of the articulating compression arm 62 between its distal end regions along the centerline 72 to its cross sectional width as viewed in FIG. 4 is greater than two to one, to permit required deflection and energizing of the articulating compression arm 62 as described more fully below.

The first distal end region 70 of the articulating compression arm 70 and the second distal end region 67 of the base 61 are joined at a connecting region 73, which forms a hinge between the base 61 and the articulating compression arm 62 as also more fully described below. The centerline 68 along the midpoint of the cross sectional width of the base 61 (which is substantially parallel to the axis 14) and the centerline 72 along the midpoint of the cross sectional width of the articulating compression arm 62 intersect approximately at the connecting region or hinge 73 at an angle 77 facing in the above mentioned second longitudinal direction toward the end wall 19. The angle 77 is substantially greater than 90 degrees and preferably about 120 degrees.

The articulating compression arm 62 in its first or relaxed position shown in FIG. 4 is generally cone shaped, with the first distal end region 70 closest to the base 61 and end wall 19 being a smaller diameter portion of the cone and the second distal end region 71 being a larger diameter portion of the cone. In this position, a generally cone shaped exterior surface 74 of the cone shaped articulating compression arm 62 faces radially toward the base 61 (i.e., radially inward in the embodiment shown in FIG. 4) while the opposite generally cone shaped exterior surface 75 of the cone shaped articulating compression arm 62 faces radially away from the base 61 (i.e., radially outward in the embodiment shown in FIG. 4).

The rocker 63 extends longitudinally and radially relative to the articulating compression arm 62 and relative to the base 61 and axis 14. The rocker 63 has first and second distal end regions 80 and 81 and a centerline 82 extending along the midpoint of the cross sectional width of the rocker 63. The ratio of the cross sectional length of the rocker 63 between its distal end regions 80 and 81 along its centerline 82 to its cross sectional width as viewed in FIG. 4 is greater than two to one, to permit required deflection and energizing of the rocker 63 as described more fully below. At a location of the rocker 63 preferably between its first and second distal end regions 80 and 81 along the centerline 82, the rocker 63 and the second distal end region 71 of the articulating compression arm 62 are joined at a connecting region 83, which forms a hinge between the articulating compression arm 62 and the rocker 63 as also more fully described below. The centerlines 72 and 82, and similarly the arm 62 and rocker 63, intersect approximately at the hinge region 83 at an angle 87 facing in the above mentioned first longitudinal direction away from the end wall 19. In the preferred embodiment, the angle 87 is substantially greater than 45 degrees. The angles 77 and 87 also establish the radial and longitudinal disposition of the rocker 63 and its centerline 82 relative to the centerline 68 of the base 61 and relative to the axis 14. Specifically, the longitudinal disposition of the rocker 63 and its centerline 82 is at substantially the same angle 87, which is substantially greater than 45 degrees, relative to the base 61 and relative to the axis 14.

Referring still to FIG. 4, at least a portion of one side 89 of the rocker 63 faces radially toward the base 61 and bottom wall 21. The opposite side of the rocker 63 faces away from the compression arm 62 and base 61 and extends generally between the distal end regions 80 and 81 to provide a generally convex sealing surface 90, which is generally curved in the preferred embodiment. When the articulating seal 60 is in its first or relaxed position as described above, the sealing surface 90 is contacted by the tapered sealing surface 29 of the member 13 with substantially a line contact extending circumferentially around the sealing surface 90 at a working sealing location 91. The term working sealing location refers to that location of a sealing surface at which the sealing surface contacts another described surface.

Figure 5:
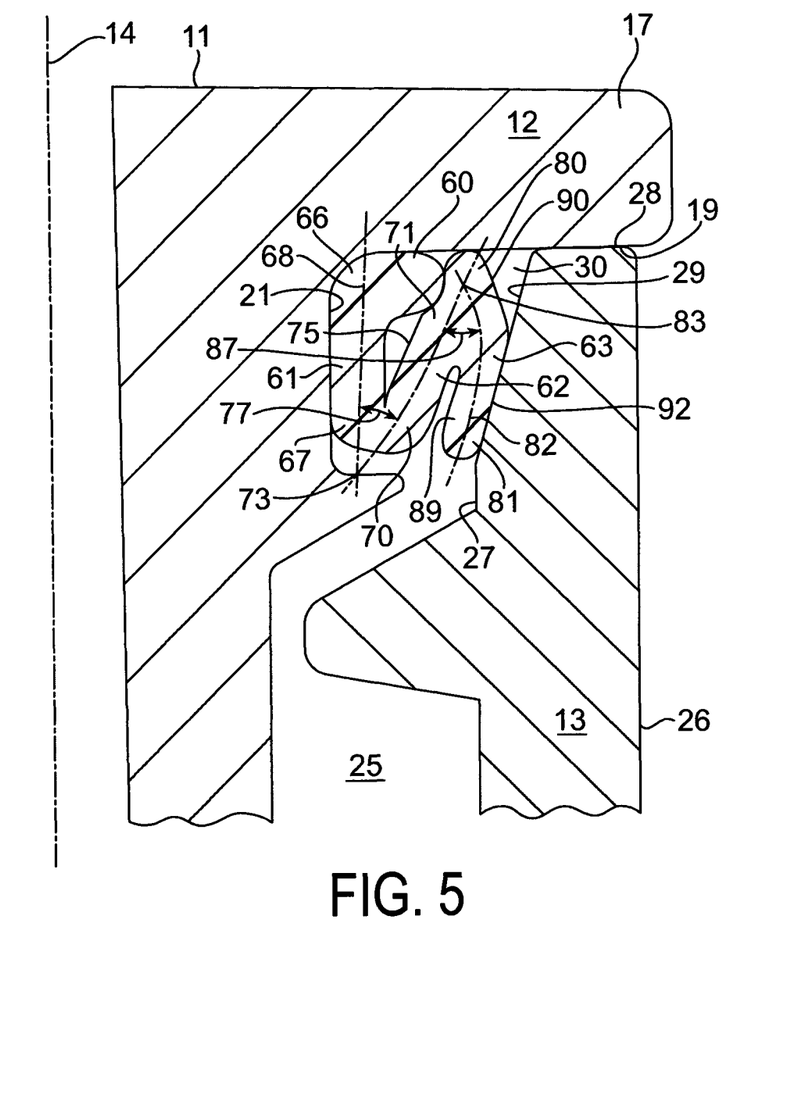
FIG. 5 is a view similar to FIG. 4, but showing the seal and the container members in a sealing position.

Referring now to FIGS. 4 and 5 together, the cap member 12 and the container member 13 are rotated relative to one another after the first or relaxed position shown in FIG. 4 is attained, so that the threaded connection described above between the members 12 and 13 causes relative longitudinal movement of the members 12 and 13. This causes the cap member 12 and the container member 13 to rotatably and longitudinally move from the first position shown in FIG. 4 to a second or sealing position shown in FIG. 5. During this movement, the tapered sealing surface 29 of the container member 13 and the groove 18 cooperatively define the annular sealing chamber 30 of decreasing volume.

Also, the generally cone shaped articulating compression arm 62 is rotated about the hinge region 73 relative to the base 61 and is simultaneously rotated about the hinge region 83 relative to the rocker 63. As this rotation of the articulating compression arm 62 continues from the relaxed position shown in FIG. 4 to the sealing position shown in FIG. 5, the cone shape of the articulating compression arm 62 inverts so that the generally cone shaped exterior surface 74 that faced the base 61 in the relaxed position shown in FIG. 4 faces away from the base 61 and toward the rocker 63 in the sealing position shown in FIG. 5. Also during this rotation, the generally cone shaped exterior surface 75 that faces away from the base 61 in the relaxed position shown in FIG. 4 faces toward the base 61 and away from the rocker 63 in the sealing position shown in FIG. 5.

The angle 77 during this movement is substantially reduced and becomes substantially smaller. The opening of the U-shaped pattern facing in the second longitudinal direction, and defined by the centerlines 68 and 72 and defined by the base 61 and arm 62, is substantially narrowed. In the preferred embodiment, the angle 77 is reduced from substantially greater than 90 degrees in FIG. 4 to substantially less than 45 degrees in FIG. 5. Similarly, the angle 87 during this movement is substantially reduced and becomes substantially smaller. The opening of the U-shaped pattern facing in the first longitudinal direction, and defined by the centerlines 72 and 82 and defined by the arm 62 and rocker 63, is substantially narrowed. In the preferred embodiment, the angle 87 is reduced from substantially greater than 45 degrees in FIG. 4 to substantially less than 45 degrees in FIG. 5.

This over center inverting movement of the cone shaped articulating compression arm 62 causes deflection and energizing of the articulating compression arm 62, so that the arm 62 in FIG. 5 provides a substantial force against the rocker 63 urging the rocker 63 away from the base 61 and against the tapered sealing surface 29. During this movement of the articulating compression arm 62, the rocker 63 rotates from its position in FIG. 4 to its position shown in FIG. 5. The sealing surface 90 of the rocker 63 is deflected against the sealing surface 29 and defines a second working sealing surface 92 of substantial annular cross sectional area that seals tightly against the tapered surface 29. Further, when the sealing position of FIG. 5 is reached, the end wall 28 of the container member 13 engages the wall 19 of the cap 12 to define the sealing position and to prevent over compression of the seal 60.

When the sealing position shown in FIG. 5 is reached, the distal end region 80 of the rocker 63 engages the end wall 19 with sealing contact and is compressed against the distal end 66 of the base 61 with sealing contact. Also, the base 61 engages the wall 21 with sealing contact, and additional sealing force to urge the base 61 against the wall 21 is provided by both the articulating compression arm 62 and the rocker 63. The base 61 and articulating compression arm 62 define the first generally U-shaped cavity described above extending at angle 77, and any negative relative pressure in the access hole 25 (and corresponding positive relative ambient pressure) that might tend to try to cause leakage past the seal created by the distal end region 80 and the wall 19 can tend to urge the rocker 63 tighter against the wall 29 and can urge the base 61 tighter against the wall 21. Similarly, the articulating compression arm 62 and rocker 63 define the second generally U-shaped cavity described above extending at angle 87, and any positive relative pressure in the access hole 25 that might tend to try to cause leakage past the seal created by the working sealing surface 92 and the wall 29 can tend to urge the rocker 63 tighter against the wall 29 and can urge the articulating compression arm 62 to force the base 61 tighter against the wall 21. In this manner, the seal 60 is double acting, meaning that its sealing forces may be enhanced by both positive and negative pressure levels in the opening 25 relative to ambient pressure.

Presently preferred embodiments of the invention are shown in the drawings and described in detail above. The invention is not, however, limited to these specific embodiments. Various changes and modifications can be made to this invention without departing from its teachings, and the scope of this invention is defined by the claims set out below. For example, and without limiting the generality of the foregoing, the seal 60 is shown in the drawings assembled in the groove 18 of the cap member 12 with the cap member 12 mounted interiorly of the container member 13. However, a mirror image of the assembly shown in FIG. 4 (and in FIG. 5) may also be provided by a modification within the scope of this invention. In this mirror image, the mounting groove and the base of the seal would be located on a radially outward member. The rocker in this modification would then be radially inward of the base, and would seal against a radially inner member, and the articulating compression arm would extend between the base and the articulating compression arm. The seal in this modified configuration would have a structure and mode of operation substantially the same as that shown and described with respect to FIGS. 4 and 5, except that the base of the seal would be compressed outwardly into the groove in the radially outward member instead of being tightly stretched over the groove of the radially inward member. Also, while some surfaces shown in FIGS. 4 and 5 are straight and some are curved, the shape of those surfaces may be altered according to the scope of the attached claims. Further, terms such as first or second or direction or inward or outward are used for purposes of description except as required by the scope of the claims.

What is claimed is:

1. An assembly comprising:
   a first member including an annular receiving groove defined between a first radial wall and a second radial wall;
   a second member including a tapered annular member sealing surface spaced radially from said groove and having a larger diameter sealing region and a smaller diameter sealing region;
   an annular elastomeric seal comprising:
   a base disposed substantially within said annular receiving groove, an articulating compression arm, and a rocker;
   said base and said articulating compression arm and said rocker each having a longitudinal axis, each being of elastomeric material, each being generally annular, and each having a relaxed position and a sealing position;
   said rocker extending radially relative to said base when said articulating compression arm is in said relaxed position and having an annular sealing surface and a first distal end region and a second distal end region, said sealing surface facing away from said base and away from said compression arm when said rocker is in its said relaxed position and when said rocker is in its said sealing position, and said sealing surface including a first annular working sealing surface region closer to said first distal end region than to said second distal end region when said rocker is in said relaxed position, and a second annular working sealing surface region closer to said second distal end region than to said first distal end region when said rocker is in said sealing position, said rocker sealing surface engaging one of said member sealing regions when said rocker sealing surface is in its said relaxed position, and said rocker sealing surface engaging the other of said member sealing regions when said rocker is in its said sealing position;
   said articulating compression arm having a first region connected to said base at a first hinge region and a second region connected to said rocker at a second hinge region intermediate said rocker distal end regions, said articulating compression arm extending longitudinally in a first longitudinal direction and radially away from said base when said articulating compression arm is in its said relaxed position and away from said groove when said articulating compression arm is in said relaxed position and when said articulating compression arm is in said sealing position;

said articulating compression arm being rotatable relative to said base about said first hinge region and being rotatable relative to said rocker about said second hinge region when said articulating compression arm and said rocker are displaced between said relaxed position and said sealing position; and said articulating compression arm extending longitudinally in a second direction opposite said first direction when said articulating compression arm and said rocker are in said sealing position, wherein said rocker and said articulating compression arm define opposite legs of a first generally U-shaped pattern that has an opening facing both radially toward said base and longitudinally in one said longitudinal direction when said articulating compression arm is in its said relaxed position, said first generally U-shaped pattern facing longitudinally is said one longitudinal direction when said articulating compression arm is in its said sealing position, and wherein said base and said articulating compression arm define opposite legs of a second generally U-shaped pattern that has an opening facing both radially away from said base and longitudinally in the other said longitudinal direction when said articulating compression arm is in its said relaxed position, said second U-shaped pattern facing longitudinally in said other longitudinal direction when said articulating compression arm is in its said sealing position, said openings of each of said patterns being substantially wider when said articulating compression arm is in said relaxed position than when said articulating compression arm is in said sealing position.

2. The assembly as set forth in claim 1, wherein said base and said articulating compression arm and said rocker are of one piece construction, and at least a major portion of said sealing surface faces longitudinally in said first direction when said rocker is in said relaxed position.

3. The assembly as set forth in claim 1, wherein said articulating compression arm is generally conical, and said sealing surface is generally convex.

4. The assembly as set forth in claim 1, wherein said articulating compression arm and said rocker each is flexible and resilient and has a cross sectional length to width ratio, and each of said ratios is greater than 2.

5. The assembly as set forth in claim 1, wherein said rotation of said articulating compression arm about said first hinge region is greater than about 45 degrees.

6. The assembly as set forth in claim 1, wherein said articulating compression arm includes a first distal end region and a second distal end region, said first hinge region is at said first distal end region of said articulating compression arm, and said second hinge region is at said second distal end region of said articulating compression arm.

7. The assembly as set forth in claim 1, wherein said first annular working surface sealing region is a circular line, said second annular working sealing surface region is an annular surface having a substantial cross sectional area, and said second annular working sealing surface region is a deformed area of said sealing surface.

8. The assembly as set forth in claim 1 wherein said rocker first annular working sealing surface region engages said larger diameter member sealing regions when said rocker is in its said relaxed position, and said rocker second annular working sealing surface region engages said smaller diameter member sealing regions when said rocker is in its said relaxed position.

9. An assembly comprising:
a first member including an annular receiving groove defined between a first radial wall and a second radial wall;
a second member including a tapered annular member sealing surface spaced radially from said groove and having a larger diameter sealing region and a smaller diameter sealing region;
an annular elastomeric seal comprising:
a base disposed substantially within said annular receiving groove, an articulating compression arm, and a rocker;
said base and said articulating compression arm and said rocker each having a longitudinal axis, each being of elastomeric material, each being generally annular, and each having a relaxed position and a sealing position;
said articulating compression arm and said rocker each being flexible and resilient and having a cross sectional length to width ratio greater than 2;
said rocker extending radially relative to said base when said articulating compression arm is in said relaxed position and having an annular sealing surface and a first distal end region and a second distal end region, said sealing surface facing away from said base and away from said compression arm and a back side facing toward said base and toward said compression arm when said rocker is in its said relaxed position and when said rocker is in its said sealing position, and said sealing surface including a first annular working sealing surface region closer to said first distal end region than to said second distal end region when said rocker is in said relaxed position, and a second annular working sealing surface region closer to said second distal end region than to said first distal end region when said rocker is in said sealing position, said rocker sealing surface engaging one of said member sealing regions when said rocker sealing surface is in its said relaxed position, and said rocker sealing surface engaging the other of said member sealing regions when said rocker is in its said sealing position;
said articulating compression arm extending radially between said base and said rocker, said articulating compression arm having a first region connected to said base and a second region connected to said rocker, said articulating compression arm extending longitudinally in a first longitudinal direction and radially away from said base when said articulating compression arm is in its said relaxed position and away from said groove when said articulating compression arm is in said relaxed position and when said articulating compression arm is in said sealing position;
said articulating compression arm extending radially away from said base and longitudinally in a second longitudinal direction opposite said first direction when said articulating compression arm and said rocker are in said sealing position;

said articulating compression arm and said base defining an angle greater than 90 degrees facing said second direction when said articulating compression arm is in said relaxed position; and said articulating compression arm and said base defining an angle less than 45 degrees facing said second direction when said articulating compression arm is in said sealing position, wherein said rocker and said articulating compression arm define opposite legs of a first generally U-shaped pattern that has an opening facing both radially toward said base and longitudinally in one said longitudinal direction when said articulating compression arm is in its said relaxed position, said first generally U-shaped pattern facing longitudinally is said one longitudinal direction when said articulating compression arm is in its said sealing position, and wherein said base and said articulating compression arm define opposite legs of a second generally U-shaped pattern that has an opening facing both radially away from said base and longitudinally in the other said longitudinal direction when said articulating compression arm is in its said relaxed position, said second U-shaped pattern facing longitudinally in said other longitudinal direction when said articulating compression arm is in its said sealing position, said openings of each of said patterns being substantially wider when said articulating compression arm is in said relaxed position than when said articulating compression arm is in said sealing position.

10. The assembly as set forth in claim 9, wherein said base and said articulating compression arm and said rocker are of one piece construction, and said rocker is radially opposite said base when said rocker is in said sealing position.

11. The assembly as set forth in claim 10, wherein said articulating compression arm is generally cone shaped, and said articulating compression arm regions are distal annular end regions of said generally cone shaped articulating compression arm.

12. The assembly as set forth in claim 11, wherein said cone shaped articulating compression arm has first and second generally cone shaped opposed external surfaces, one of said cone shaped external surfaces faces radially inward toward said longitudinal axes and the other of said cone shaped external surfaces faces radially outward away from said longitudinal axes when said cone shaped articulating compression arm is in said relaxed position, and said one of said cone shaped external surfaces races radially outward away from said longitudinal axes and said other of said cone shaped external surfaces faces radially inward toward said longitudinal axes when said cone shaped articulating compression arm is in said sealing position.

13. The assembly as set forth in claim 9, wherein said articulating compression arm region is connected to said rocker at a connection location intermediate said rocker distal end regions, and said sealing surface is intermediate said rocker distal end regions.

14. The assembly as set forth in claim 9, wherein said sealing surface is a generally curved convex surface.

15. The assembly as set forth in claim 9, wherein said first annular working surface sealing region is a circular line, said second annular working sealing surface region is an annular surface having a substantial cross sectional area, and said second annular working sealing surface region is a deformed area of said generally curved convex sealing surface.

16. The assembly as set forth in claim 15, wherein said first annular working sealing surface region is intermediate said first rocker distal end and said intermediate location, and said second annular working sealing surface region is intermediate said second rocker distal end and said intermediate location.

17. The assembly as set forth in claim 16, wherein said rocker and said articulating compression arm are radially outward from said base.

18. The assembly as set forth in claim 16, wherein said rocker and said articulating compression arm are radially inward from base.

19. The assembly as set forth in claim 9 wherein said rocker first annular working sealing surface region engages said larger diameter member sealing regions when said rocker is in its said relaxed position, and said rocker second annular working sealing surface region engages said smaller diameter member sealing regions when said rocker is in its said relaxed position.

20. An assembly comprising:

a vessel having an interior containing a source of fluid pressure and an opening into the interior, and a tapered leading edge surface surrounding a longitudinal axis of the opening;— a closure being receivable in the opening coaxially with the longitudinal axis thereof and having a circumferential gland facing the edge surface of the opening when the closure is so received in the opening, the gland having axially-separated first and second end walls which extend radially from a side wall; and an elastomeric seal extending radially about a central seal axis and received within the gland coaxially with a longitudinal axis of the closure, the seal comprising as received in a free state within the gland with the closure being received coaxially in the opening:

a generally annular body portion having a base portion retained between the gland first and second end walls, the base portion having an upper end face disposed opposite the gland first end wall and the body extending axially along the seal axis between the upper end face and a lower arm portion disposed opposite the gland second end wall, the arm portion extending radially from the body towards the edge surface of the opening; and a lip portion extending radially towards the interior of the vessel from a proximal end connected to the arm portion to a distal end spaced-apart from the arm portion to define a spacing therebetween, whereby as the closure is further received within the opening along the longitudinal axis thereof, the seal lip portion contacts the edge surface of the opening effecting the pivoting of the seal arm portion towards the gland first end wall such that the lip portion is disposed in a deflected state of the seal against the edge surface of the opening, and whereby in the deflected state of the seal the seal lip portion is urged into a sealing engagement against the edge surface of the opening as energized by fluid pressure being received within the spacing between the seal lip portion distal end and the seal arm portion, and wherein said seal lip portion and said seal arm portion define opposite legs of a first generally U-shaped pattern that has an opening facing both radially toward said base and longitudinally in one said longitudinal direction when said seal is in its said free state, said first generally U-shaped pattern facing longitudinally in said one longitudinal direction when said seal is in its said deflected state, and wherein said base and said arm portion define opposite legs of a second generally U-shaped pattern that has an opening facing both radially away from said base and longitudinally in the other said longitudinal direction when said seal is in its said free state, said second U-shaped pattern facing longitudinally in said other longitudinal direction when said seal is in its said deflected state, said openings of each of said patterns being substantially wider when said seal is in said free state than when said seal is in its said deflected state.

21. The assembly of claim 20 wherein the seal is formed of an elastomeric polymeric material.

22. The assembly of claim 21 wherein in the deflected state of the seal the seal upper end face and lip proximal end each is disposed in a sealing engagement against the gland first end wall.

* * * * *